United States Patent [19]

Yeomans

[11] Patent Number: 4,866,514
[45] Date of Patent: Sep. 12, 1989

[54] IMAGE PROCESSING HAVING A SECOND SET OF LOOK-UP-TABLES (LUTS) FOR GENERATING ERROR VALUE SIGNALS

[75] Inventor: Andrew J. V. Yeomans, Hertfordshire, England

[73] Assignee: Crosfield Electronics Limited, London, England

[21] Appl. No.: 247,545

[22] Filed: Sep. 22, 1988

[30] Foreign Application Priority Data

Sep. 22, 1987 [GB] United Kingdom ............... 8722228

[51] Int. Cl.⁴ .............................................. H04N 1/46
[52] U.S. Cl. ....................................... 358/80; 358/75; 358/76
[58] Field of Search ............................. 358/75, 76, 80

[56] References Cited

U.S. PATENT DOCUMENTS

| | | | |
|---|---|---|---|
| 4,346,402 | 8/1982 | Pugsley | 358/80 |
| 4,488,245 | 12/1984 | Salke et al. | 358/80 |
| 4,573,071 | 2/1986 | Sakamoto | 358/76 |
| 4,598,282 | 7/1986 | Pugsley | 358/76 |
| 4,667,227 | 5/1987 | Ikeda | 358/75 |
| 4,727,425 | 2/1988 | Wayne et al. | 358/78 |
| 4,802,107 | 1/1989 | Yamamoto et al. | 358/76 |

Primary Examiner—Howard W. Britton
Assistant Examiner—Kim Yen Vu
Attorney, Agent, or Firm—Sughrue, Mion, Zinn, Macpeak and Seas

[57] ABSTRACT

Apparatus for processing a digital representation of an image in which each pixel is defined by at least one digital color component value, the value comprising one of a first set of values defining a first scale of color component values. The apparatus comprises a store for storing digital color component values for the image pixels; and a first look-up table (LUT) addressed by a color component value from the store corresponding to a selected pixel, the first LUT generating a signal representing a modified color component value chosen from a set of modified color component values defining a second scale coarser than the first scale. Three second LUTs are provided which are addressed by the color component value from the store in parallel with the first LUT, each second LUT generating an error value signal, the sum of the error values being equal to the difference between the modified color component value and the color component value from the store as measured on the first scale. Modification stores allow corresponding color component values of pixels associated with the selected pixel to be modified in accordance with respective ones of the error value signals.

9 Claims, 2 Drawing Sheets

IMAGE PROCESSING HAVING A SECOND SET OF LOOK-UP-TABLES (LUTS) FOR GENERATING ERROR VALUE SIGNALS

FIELD OF THE INVENTION

The invention relates to apparatus for processing a digital representation of an image in which each pixel is defined by at least one digital colour component value.

DESCRIPTION OF THE PRIOR ART

Digitised images are commonly quantised to 8 bits per colour component, which is adequate for most applications. Monochrome images will be defined by one value per pixel, while colour images may be defined by three (red, green and blue) or four (cyan, magenta, yellow and black) colour component values. The processing of these values during interactive image modifications such as colour retouching and the like can take a significant amount of time. In order to reduce the time involved, and to reduce the amount of high-speed storage memory required, use is made of the property of the human visual system that the grey level resolution of the display device such as a monitor need not necessarily match the grey scale resolution of the image itself. For example, it has been reported that under typical viewing conditions RGB images displayed at 15 bits per pixel and 24 bits per pixel are indistinguishable.

Digitised images are also often converted to one bit per colour component, to produce a half tone image for certain printing processes. This process often also increases the image resolution, so that for example, each pixel of the original is represented by 36 single bit pixels in the half tone image.

Proposals have been made in the past to quantise pixels for the purposes of display into a second, coarser grey scale. These techniques involve allotting one of the second grey level values to each pixel colour component in accordance with certain algorithms. In a very simple process, each pixel colour component is allotted the second grey level value closest to it. One of the problems with this simple process is that artificial contouring would result.

One method which has been proposed to reduce this problem involves computing a value of a second grey level scale coarser than the first scale which defines the original colour component values and determining the difference between the two values. This difference or error is then distributed amongst adjacent pixels of the selected pixel to modify the pixel value. This is described in "A survey of Electronic Techniques for Pictorial Image Reproduction" by J. C. Stoffel et al, IEEE Transactions on Communications, Vol COM-29, pp 1898–1925, in particular page 1907.

One of the problems with this known system is that the amount of computation needed to determine for each pixel colour component the difference between the two values, the amounts of the resultant error which should be distributed to each pixel, and the modification of each of these pixels in accordance with the error amounts takes a relatively long time.

Another problem is that significantly more computation is required if the coarser grey scale is not linearly related to the original grey scale. Often a non-linear scale is required to compensate for the characteristics of a monitor.

SUMMARY OF THE INVENTION

In accordance with the present invention, apparatus for processing a digital representation of an image in which each pixel is defined by at least one digital colour component value, the value comprising one of a first set of values defining a first scale of colour component values comprises a store for storing digital colour component values for the image pixels; a first look-up table (LUT) addressed by a colour component value from the store corresponding to a selected pixel, the first LUT generating a signal representing a modified colour component value chosen from a set of modified colour component values defining a second scale coarser than the first scale; at least one second LUT which is addressed by the colour component value from the store in parallel with the first LUT, the or each second LUT generating an error value signal; and modification means for modifying corresponding colour component values of pixels associated with the selected pixel in accordance with respective ones of the error value signals.

The invention avoids the problems outlined above by replacing the computational technique with a set of look-up tables. Simple corrections may be performed by a single second LUT, but better quality results will be obtained by using more. In general, there will be at least two second LUTs and in the preferred arrangement there are three second LUTs.

Each second LUT typically corresponds to a respective one of the associated pixels.

In the preferred example, each colour component signal from the store simultaneously addresses in parallel the first and second LUTs, the output signal from the first LUT being stored in a further, output store.

In some examples, the error value or the sum of the error values being equal to the difference between the modified colour component value and the colour component value from the store as measured on the first scale.

In general, the pixels associated with the selected pixel which are modified comprise pixels which have not yet been used to address the first LUT.

Typically, the modification means will comprise a suitably programmed micro-programmable address controller in conjunction with incrementing adder circuits.

The second LUTs are set up prior to operation of the apparatus, preferably so that the total difference between the modified colour component value and the original colour component value will be substantially equally divided between the pixels which are modified.

In general, the second LUTs and the first LUT will be formed by separate, one-dimensional look-up tables but in some cases two or more of the LUTs could be combined into suitable two-dimensional look-up tables.

The colour component values of the second grey scale will generally correspond to evenly spaced apart values of the first scale although this is not essential.

BRIEF DESCRIPTION OF THE DRAWINGS

Two examples of apparatus according to the invention will now be described with reference to FIGS. 1 and 2 of the accompanying drawings which are block diagrams of the first and second examples respectively.

DETAILED DESCRIPTION OF THE EMBODIMENTS

Figure 1:
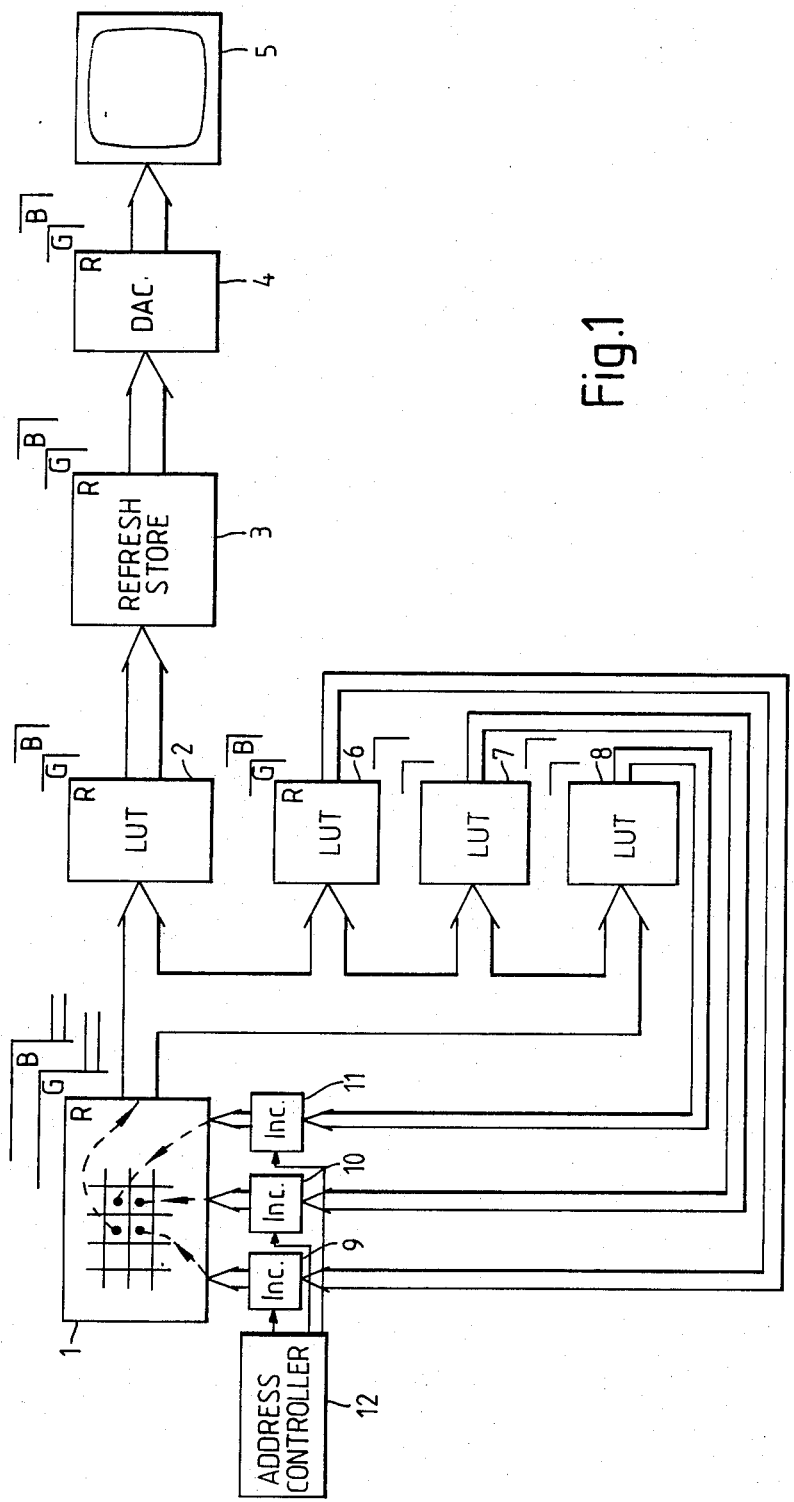

The apparatus shown in FIG. 1 comprises an image store 1 which stores digitally the colour component values for each pixel of an image. Typically, these colour components will each be defined on a grey level scale in the range 0-255, thus requiring up to 8 bits to represent them. The colour components in this example comprise red, green and blue. The values for each pixel are fed in turn to a respective first look-up table (LUT) 2, (one for each colour component) with a length equal to the number of grey level values, for example 255. Each location in the LUT 2 is loaded with a colour component value selected from a second grey level scale coarser than the first typically requiring no more than two or three binary digits.

The output signals from the LUT 2 are stored in a refresh store 3 and fed via a digital-to-analog converter 4 to a monitor 5.

Each signal from the image store 1 is also fed in parallel to each of a respective set of three LUTs 6-8 which are addressed by the input signal and generate respective error signals which are fed to incrementing circuits 9-11 of a programmable address controller 12. The corresponding colour component, as defined in the image store 1, in a number of adjacent pixels to the selected pixel is then modified in a predetermined manner in response to the received error signals by, in this example, adding the error values to the previously stored values.

The Table below indicates an example of part of the content of each of the look-up tables 2, 6-8 for different pixel values on the first scale.

TABLE

| Pixel Value | New Value LUT 2 | LUT 6 Err 1 | LUT 7 Err 2 | LUT 8 Err 3 |
|---|---|---|---|---|
| 63 | 60 | 1 | 1 | 1 |
| 64 | 60 | 2 | 1 | 1 |
| 65 | 70 | −2 | −2 | −1 |
| 66 | 70 | −2 | −1 | −1 |

The new values are here expressed in terms of the first grey level scale but in practice will be in terms of the second coarse grey level scale.

The content of the LUT 2 defines the second grey level scale which, in this example, corresponds to first grey scale values of 10, 20, 30, 40, 50, 60, 70 etc. Each input signal which may vary between 0 and 255 is allotted one (the closer) of these values and, as can be seen in the Table, an input signal with value 63 will be allotted a modified value of 60. The result of this is that there is an "error" of 3 (on the first scale) between the input signal and the output signal from the LUT 2.

To take account of this, the locations addressed by the input signal with value 63 in LUTs 6-8, each contain an error value of 1 so that the total is 3 and equal to the total error. This automatically divides the total error in the manner predetermined by the values stored in the LUTs 6-8 and these values are fed to the circuits 9-11. The address controller 12 then addresses pixels immediately below, to the right, and diagonally adjacent to the selected pixel (these pixels corresponding to pixels not yet accessed from the image store 1), and modifies the values accordingly. In the simplest example, each error value can be added to the corresponding colour component of the pixel addressed.

For each pixel in the image store 1, this process is repeated for each colour component and then the next pixel is accessed.

The output signals from the LUT 2 control the monitor display in a conventional manner.

Care must be taken to ensure that the modified pixel values do not exceed the range of values that may be held in the store 1. This may be done by ensuring that the original image only uses a restricted range input level, for example 30 to 220, so that the sum of the original value and the error values cannot fall outside the range 0 to 255.

Figure 2:
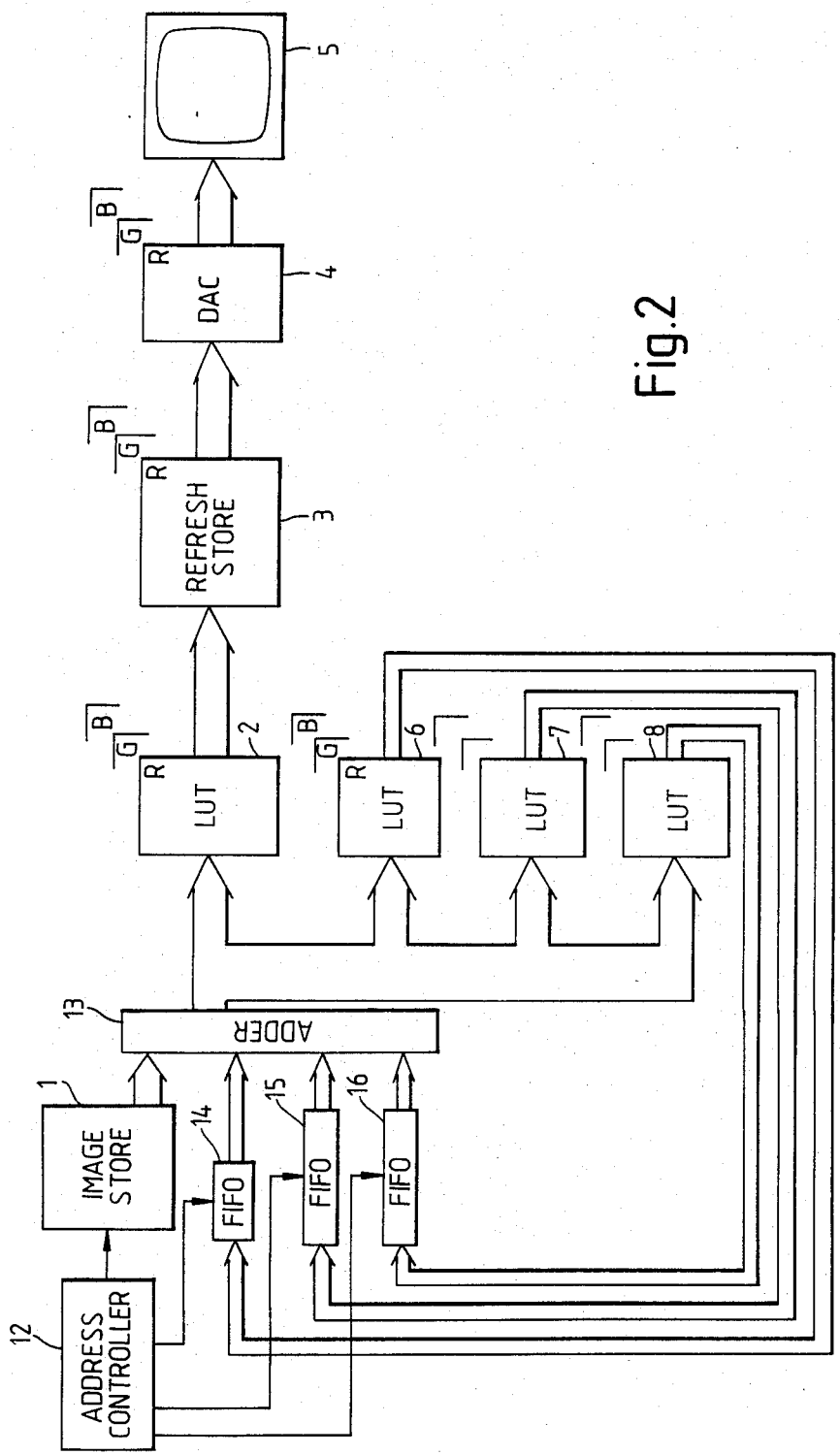

In an alternative arrangement illustrated in FIG. 2, the error values are held in separate smaller stores, and only added to the image store value just prior to conversion of that value from the first to the second grey level scale. In FIG. 2, components which are substantially the same as those shown in FIG. 1 have been given the same reference numerals.

The apparatus of FIG. 2 includes an adder circuit 13 to which is fed a pixel value from the image store 1 and three error values from respective FIFO stores 14-16. The stores 14-16 have a size of one pixel, one image line, and one image line+one pixel respectively and are connected to the LUTs 6-8 respectively.

At the start of a conversion process, the address controller 12 clears the error stores 14-16. Thereafter, the pixel value output by the adder 13 is fed in parallel to the LUTs 2, 6-8 to generate the modified pixel value which is fed to the refresh store 3 and the error values generated by the LUTs 6-8, as before. These error values are then fed to respective stores 14-16 instead of being used immediately to increment the values in the image store 1. The values then remain in the stores 14-16 and are added to the appropriate pixel values from the image store 1 when those pixels are read out of the image store. For example, the error value generated by the LUT 6 is to be added to the next pixel value to be read from the store and thus is fed to the FIFO store 14 which has a size of one pixel. The error value from the LUT 7 is to be added to the pixel immediately below the pixel which has just been accessed from the image store 1 (ie. in the next image line) and this is spaced by the number of pixels in a single line from the pixel which has just been processed. Thus, the store in FIFO 15 has a capacity of one line of pixels. Finally, the error value from the LUT 8 is to be added to the pixel diagonally below the pixel just processed so that the FIFO store 16 has a capacity of one line of the image+one pixel. In this way, up to three error values generated at different times will be added to a pixel value read from the store 1 before the fully modified pixel value is applied to the LUTs 2, 6-8.

This version of the apparatus is particularly suitable if the image store 1 is held in a slow sequential device such as a magnetic disc, because each pixel of the image is read only once, in sequential order and is not modified within the store. The refresh store 3 would use fast memory to hold the image for final display.

In a modification of the FIG. 2 apparatus, one or more of the second LUTs 6-8 may be connected to more than one FIFO store since this allows errors to be distributed.

I claim:

1. Apparatus for processing a digital representation of an image in which each pixel is defined by at least one digital color component value, said value comprising one of a first set of values defining a first scale of color component values, the apparatus comprising a store for storing digital color component values for said image pixels; a first look-up table (LUT) addressed by a color component value from said store corresponding to a selected pixel, said first LUT generating a signal representing a modified color component value chosen from a set of modified color component values defining a second scale coarser than the first scale; at least one second LUT which is addressed by said color component value from said store in parallel with said first LUT, said at least one second LUT generating an error value signal; and modification means for modifying corresponding color component values of pixels associated with the selected pixel in accordance with respective ones of said error value signals.

2. Apparatus according to claim 1, the apparatus comprising three second LUTs.

3. Apparatus according to claim 1, further comprising an output store wherein each colour component signal from said image store simultaneously addresses in parallel said first and second LUTs, the output signal from said first LUT being stored in said output store.

4. Apparatus according to claim 1, wherein said modification means comprises a number of incrementing adder circuits, one associated with each second LUT to increment respective colour component values held in said store and associated with pixels adjacent to the selected pixel by the error values generated by the corresponding LUT.

5. Apparatus according to claims 1, wherein said modification means comprises an adder circuit; and a number of error stores, one associated with each second LUT for storing error values generated by the corresponding second LUT, said stored error values being fed selectively to the adder circuit together with colour component values from said store so as to generate the modified colour component values.

6. Apparatus according to claim 5, wherein each said error store comprises a FIFO store.

7. Apparatus according to claim 6, wherein the apparatus comprises three second LUTs, and wherein one error store holds a single error value, another error store holds an error value for each pixel in a line of pixels, and a third error store holds an error value for each pixel in a line of pixels and one extra error value.

8. Apparatus according to claim 1, wherein each LUT comprises a one-dimensional look-up table.

9. Apparatus according to claim 1, wherein the error value or the sum of said error values is equal to said difference between the modified colour component value and the colour component value from the store as measured on the first scale.

* * * * *